US008957912B2

(12) United States Patent
Jardine-Skinner

(10) Patent No.: US 8,957,912 B2
(45) Date of Patent: *Feb. 17, 2015

(54) DISPLAYING ITEMS IN AN APPLICATION WINDOW

(75) Inventor: Evan G. Jardine-Skinner, Hampshire (GB)

(73) Assignee: International Business Machines Corporation, Armonk, NY (US)

(*) Notice: Subject to any disclaimer, the term of this patent is extended or adjusted under 35 U.S.C. 154(b) by 115 days.

This patent is subject to a terminal disclaimer.

(21) Appl. No.: 13/519,725

(22) PCT Filed: May 4, 2011

(86) PCT No.: PCT/EP2011/057083
§ 371 (c)(1),
(2), (4) Date: Jun. 28, 2012

(87) PCT Pub. No.: WO2011/141333
PCT Pub. Date: Nov. 17, 2011

(65) Prior Publication Data
US 2013/0088510 A1 Apr. 11, 2013

(30) Foreign Application Priority Data

May 12, 2010 (EP) .................................... 10162711

(51) Int. Cl.
G09G 5/00 (2006.01)
G06F 9/44 (2006.01)
G06F 17/30 (2006.01)

(52) U.S. Cl.
CPC .............. G09G 5/003 (2013.01); G06F 9/4443 (2013.01); G06F 17/30905 (2013.01)
USPC .......................................................... 345/619

(58) Field of Classification Search
None
See application file for complete search history.

(56) References Cited

U.S. PATENT DOCUMENTS 5,701,137 A 12/1997 Kiernan et al.
6,961,909 B2 11/2005 Lord et al.
(Continued)

FOREIGN PATENT DOCUMENTS

CN 1503160 A 6/2004
CN 1713158 A 12/2005
WO WO2011141333 A2 11/2011

OTHER PUBLICATIONS

Notice of Allowance, dated Oct. 22, 2013, regarding U.S. Appl. No. 13/565,093, 18 pages.
(Continued)

Primary Examiner — Ryan R Yang
(74) Attorney, Agent, or Firm — Yee & Associates, P.C.; William J. Stock

(57) ABSTRACT

A method of displaying a series of items in an application window on a display device, the method comprising the steps of rendering a subset of the series of items in the application window, calculating the vertical size of each rendered item, calculating the vertical size of the minimal rendered item, calculating the difference of the application window height minus the vertical size of the element containing all rendered items, determining candidate items for addition to the subset if the difference is positive, or determining candidate items for removal from the subset if the difference is negative, iterating through the candidate items, rendering a new subset of the series of items in the application window by adding or removing the iterated candidate items, and repeating steps of the process until the maximum number of items that can be displayed is displayed.

7 Claims, 6 Drawing Sheets

(56) References Cited

U.S. PATENT DOCUMENTS

| | | |
|---|---|---|
| 7,065,707 B2 | 6/2006 | Chen et al. |
| 7,903,277 B2 | 3/2011 | Cudd et al. |
| 8,201,101 B2 | 6/2012 | Wiley |
| 2005/0289235 A1 | 12/2005 | Suematsu et al. |
| 2009/0089668 A1 | 4/2009 | Magnani et al. |
| 2010/0122158 A1 | 5/2010 | Tarumi |
| 2012/0293543 A1 | 11/2012 | Jardine-Skinner |

OTHER PUBLICATIONS

International search report dated Dec. 15, 2011 regarding application PCT/EP2011/057083, filing date May 4, 2011, applicant International Business Machines Corporation, 9 pages.

Jardine-Skinner, "Displaying Items in an Application Window," U.S. Appl. No. 13/565,093, filed Aug. 2, 2012, 22 pages.

DISPLAYING ITEMS IN AN APPLICATION WINDOW

TECHNICAL FIELD

This invention relates to a method of displaying a series of items in an application window on a display device. In one embodiment, the invention can provide a system and method for calculating the displayable items in a single page HTML table.

BACKGROUND INFORMATION

In modern business computing environments such as desktop computing, a user will have a display device attached to a computer. The computer will run an operating system that will interact with display hardware and software components to control the output of the display device. Many different display devices with different hardware and software capabilities are in existence. There are many different sizes of display devices with different usable display areas. The computer, usually through a graphics processing unit (also called a graphics card) will adapt the display data to suit the size of the display device. However, in many situations data will be accessed for display that has not been created with the specific end display parameters in mind. For example, when a computer is running a web browser and a user is accessing data from a website, the data will be sent to the computer without any knowledge of the size of the usable display area.

When presenting long lists of items to end users pagination controls are often used to prevent the need to vertically scroll the window. These pagination controls split list of, for example, one hundred items into blocks of ten and then display a single page at a time, allowing the user to click a control to move between the pages. However, difficulties arise if some items occupy more vertical space (pixels) then other items. To achieve the goal of preventing vertical scrolling, the pagination control must dynamically change the number of items displayed on a single page to allow larger items to fit in the window. For a thick client application this is a simple affair as the sizes can be calculated before the items are displayed. For a thin client, for example, running in a web browser without any proprietary plug-ins this is not easy as the sizes of the items will not be known before they are rendered.

US patent application 2009/0089668 (Magnani, J. A. et al. "System and method of automatically sizing and adapting a widget to available space", Apr. 2, 2009) discloses a smart-sizing, browser-based widget using both information provided by the web browser and webpage, within which it is being displayed, to calculate, in real-time, which if its elements to display, and at what scale, so as to make the most of efficient use of its available space.

It is therefore an object of the invention to improve upon the known art.

SUMMARY

According to a first aspect of the present invention, there is provided a method of displaying a series of items in an application window on a display device, the method comprising the steps of:
a) rendering a subset of the series of items in the application window,
b) calculating the vertical size of each rendered item as an integer multiple of the vertical size of the minimal rendered item,
c) calculating the vertical size, in pixels, of the minimal rendered item as the vertical size of the element containing all rendered items divided by the sum of the integer values calculated in step b) of the vertical sizes of the rendered items,
d) calculating the difference, in pixels, of the application window height minus the vertical size of the element containing all rendered items,
e) determining candidate items for addition to the subset if the difference is positive, or determining candidate items for removal from the subset if the difference is negative, the number of candidates items equal to the difference calculated in step d) divided by the vertical size of the minimal rendered item calculated in step c),
f) iterating through the candidate items, calculating the vertical size of each candidate item as an integer multiple of the vertical size of the minimal rendered item until the sum of the vertical size of the iterated candidate items is equal to the difference calculated in step d) divided by the vertical size of the minimal rendered item calculated in step c),
g) rendering a new subset of the series of items in the application window by adding or removing the iterated candidate items from step f) according to the result of step e), and
h) repeating steps b) to g) until the maximum number of items that can be displayed is displayed.

According to a second aspect of the present invention, there is provided a client device for displaying a series of items in an application window on a display device, the device arranged to:
a) render a subset of the series of items in the application window,
b) calculate the vertical size of each rendered item as an integer multiple of the vertical size of the minimal rendered item,
c) calculate the vertical size, in pixels, of the minimal rendered item as the vertical size of the element containing all rendered items divided by the sum of the integer values calculated in action b) of the vertical sizes of the rendered items,
d) calculate the difference, in pixels, of the application window height minus the vertical size of the element containing all rendered items,
e) determine candidate items for addition to the subset if the difference is positive, or determining candidate items for removal from the subset if the difference is negative, the number of candidates items equal to the difference calculated in action d) divided by the vertical size of the minimal rendered item calculated in action c),
f) iterate through the candidate items, calculating the vertical size of each candidate item as an integer multiple of the vertical size of the minimal rendered item until the sum of the vertical size of the iterated candidate items is equal to the difference calculated in action d) divided by the vertical size of the minimal rendered item calculated in action c),
g) render a new subset of the series of items in the application window by adding or removing the iterated candidate items from action f) according to the result of action e), and
h) repeat actions b) to g) until the maximum number of items that can be displayed is displayed.

Viewed from a further aspect, the present invention provides a computer program product for displaying a series of items in an application window on a display device, the computer program product comprising: a computer readable storage medium readable by a processing circuit and storing instructions for execution by the processing circuit for performing a method for performing the steps of the invention.

Viewed from a further aspect, the present invention provides a computer program stored on a computer readable medium and loadable into the internal memory of a digital computer, comprising software code portions, when said program is run on a computer, for performing the steps of the invention.

Advantageously, owing to the invention, it is possible to provide a method of recalculating the number of items that will fit on a current page without using any proprietary plug-in environments, for example when rendering a table using a web browser. In one embodiment, the invention uses JavaScript and html to achieve the functionality. For a thin client the advantage is that no proprietary plug-in is required by the end-user. The method of the invention will provide a fast and effective procedure for calculating the number of items of a list of items that can be accommodated in an application window, without the need for the user to scroll to see any items that are not currently displayed. When the user pages to a further page in the list, the items that can be displayed is re-calculated at that point in time.

Preferably, the step b) of calculating the vertical size of each rendered item as an integer multiple of the vertical size of the minimal rendered item comprises calculating the vertical size of each rendered item as a number of display lines. The method can be effectively operated based upon the premise that in this embodiment each item may have an optional variable length description that will take up a specific number of lines of the available display area of the application window. The minimal rendered item will have a single line assigned to it, and all other items will be assigned an integer multiple of that number of lines. The number of lines assigned to an item may be one only if it has no optional description.

In this case, it is advantageous if the calculating of the vertical size of a rendered item as a number of display lines comprises calculating the character length of the display item multiplied by a scaling integer derived from the font size, dividing by the width of the application window in pixels, rounding down to a whole number and adding one. The scaling integer, which could be five, for example, can be calculated by measuring single character in the browser. This formula provides a simple and efficient method by which the number of lines to be assigned to an item can be approximately calculated.

Ideally the method further comprises, when determining candidate items for addition to the subset if the difference is positive in step e), determining whether items before or after the currently rendered items should be added. Equally, it is advantageous if the method further comprises, when determining candidate items for removal from the subset if the difference is negative in step e), determining whether items at the start or at the end of the currently rendered items should be removed. Once it has been determined that items need to be added or removed from the displayed list of items, then using paging information it can be determined from where the items should be added/removed.

For example, if items are being added and the user is on the first page or has paged forwards, then the items to be added should come from those after the last item currently rendered. If items are being added and the user is on the last page or has paged backwards, then the items to be added should come from those before the first item currently rendered. If items are being removed and the user is on the first page or has paged forwards, then the items to be removed should come from those counting back from the last item currently rendered. If items are being removed and the user is on the last page or has paged backwards, then the items to be removed should come from those counting forward from the first item currently rendered.

BRIEF DESCRIPTION OF THE DRAWINGS

Embodiments of the present invention will now be described, by way of example only, with reference to the accompanying drawings, in which.

DETAILED DESCRIPTION OF THE INVENTION

Figure 1:
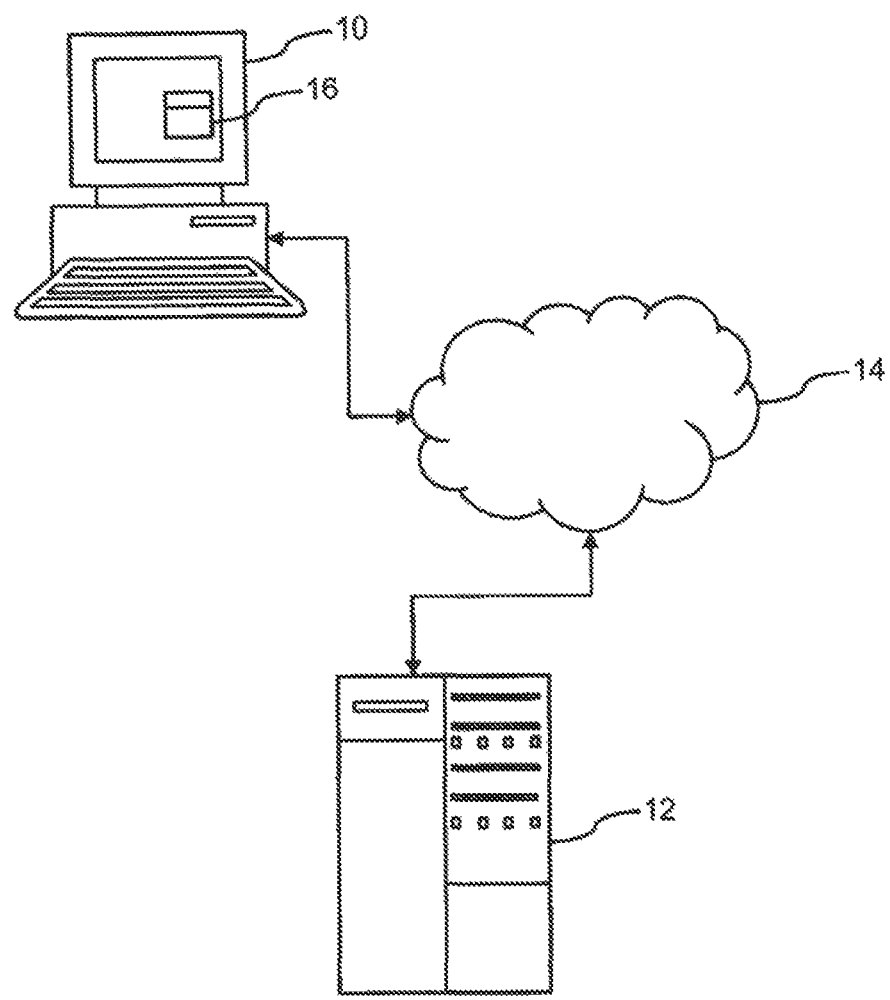
FIG. 1 is a schematic diagram of a client-server arrangement in accordance with the prior art, and in which a preferred embodiment of the present invention may be implemented.

An example of a client-server system is shown in FIG. 1. A client device 10, such as a conventional computer or mainframe terminal, connects to a server 12 via a network 14. The network 14 could be a local network, or a wide area network such as the Internet. The client device 10 connects to the server using conventional communication protocols such as TCP/IP or any other appropriate communication arrangement. The server 12 is hosting a service that is being accessed by a user of the computer 10. For example, the server 12 may be hosting a website that the user is accessing through a web browser application running on the computer 10.

An application window 16 is displayed by the display device of the computer 10, which is the graphical user interface of the web browser that the user is running to access the website provided by the server 12. The user performs actions at their local computer 10 which results in the transmission and reception of communications to and from the server 12. The website 12 provided by the server 12 may contain information that is to be displayed in the application window 16 in the form of a table. This is a common method by which data is formatted, for example, after the user makes a search on data provided via the website provided by the server 12.

When the server 12 is to provide a table to the client device 10, for example, with one hundred items, then current practice is to break this table into pages of, for example, ten items. The user can then navigate through the pages and can sometimes change the number of items to be shown on an individual page. Currently, if the application window 16 is not large enough to show the entirety of the page that has been sent by the server 12, then the top of the page of ten items will be shown, with a scroll-bar on one side of the application window, so that the user can scroll down to see those items that are not currently visible in the table.

Figure 2:
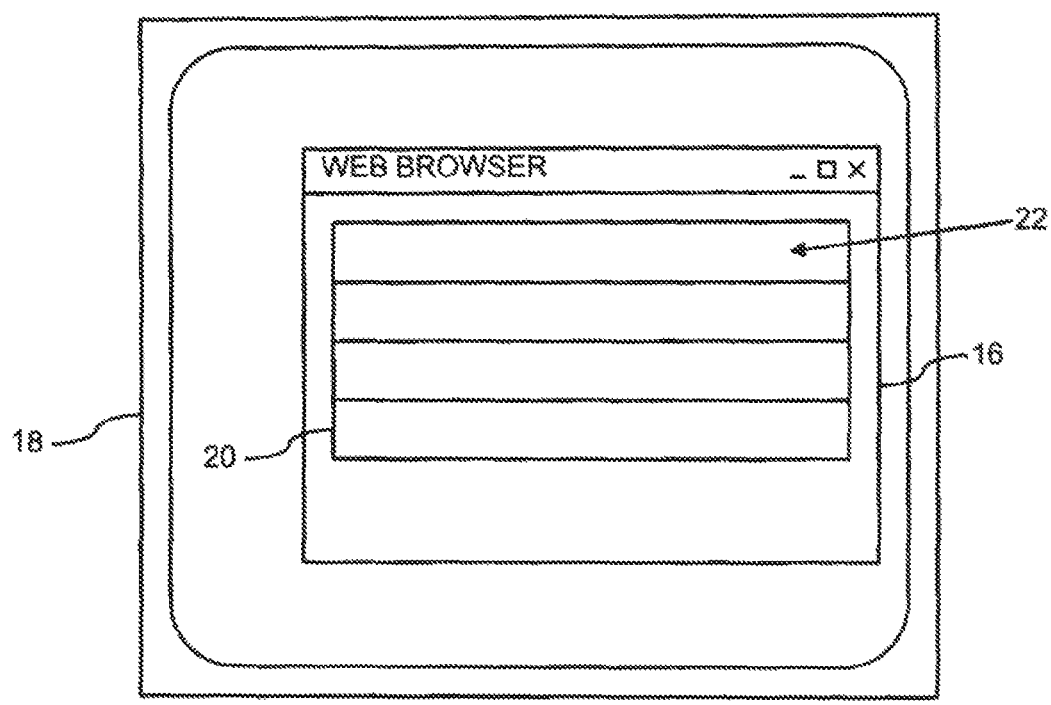
FIG. 2 is a schematic diagram of a display device, in accordance with the prior art, and in which a preferred embodiment of the present invention may be implemented.

FIG. 2 shows the display device 18 of the client device 10 in more detail. The application window 16 that is being shown by the display device 18 is for a web browser that is connecting to the server 12. The window 16 is showing a table 20 that is made up of individual items 22. In this example, the table 20 comprises 22 individual items all of which have the same vertical size. In reality, many tables 20 that are delivered in this way for display within an application window 16 of, for example, a web browser will have many more items 22 than the four shown here, and will often have items of variable lengths and sizes.

The application window 16 is controlled to display the table 20 in such a fashion that as many items 22 as possible can be fitted into the window 16, without requiring the presence of a scroll-bar on one side of the application window 16. No items 22 will be displayed in such a way that the user requires further navigation to view those items. This is achieved without the need for any amendment to the operation of the web browser, either directly or by the use of proprietary plug-ins. This means that the display process delivered by the client device 10 can be carried out on so-called thin clients, which do not have large processing capabilities.

The improved display method is achieved, in the preferred embodiment, by the use of a JavaScript program that is delivered by the server 12 along with the items 22 that are to be displayed in the table 20. The JavaScript program will be executed within the web browser in a conventional manner, as the relevant web page is loaded. The JavaScript language is generally supported by the vast majority of web browsers. The JavaScript program will control the display of the items 22 within the table 20 as the user navigates the pages of the table 20 that has been generated for the items 22 received from the server 12.

The JavaScript program delivers a process with a series of steps. The first step, Step 1, is to allow the browser to render the page with five or some other small number of items 22. The second step, Step 2, is to then work out the approximate size of each item 22, as a multiple of the minimal item size, by analyzing the data to be displayed. In this illustration it is considered that items 22 may or may not have a variable length description. The approximate item size or number of lines needed to display the item 22, where one line is that needed for an item 22 with no description, is calculated using a simple expression.

If the item 22 has a description, then the number of lines needed to display that item is set to one plus a truncation of the description length times five (which is a scaling integer derived from the font size) divided by the window width, where the description length is the character length of the item description and window width is the width of the usable browser window 16 in pixels. The truncation rounds down the result of the calculation to the nearest integer. Otherwise, for an item with no description then the number of lines needed to display that item equals one. So, for example, if there are five items 22 to be rendered then the calculated number of lines needed to display the items may have values to be: 1, 3, 4, 1, 2.

Figure 3:
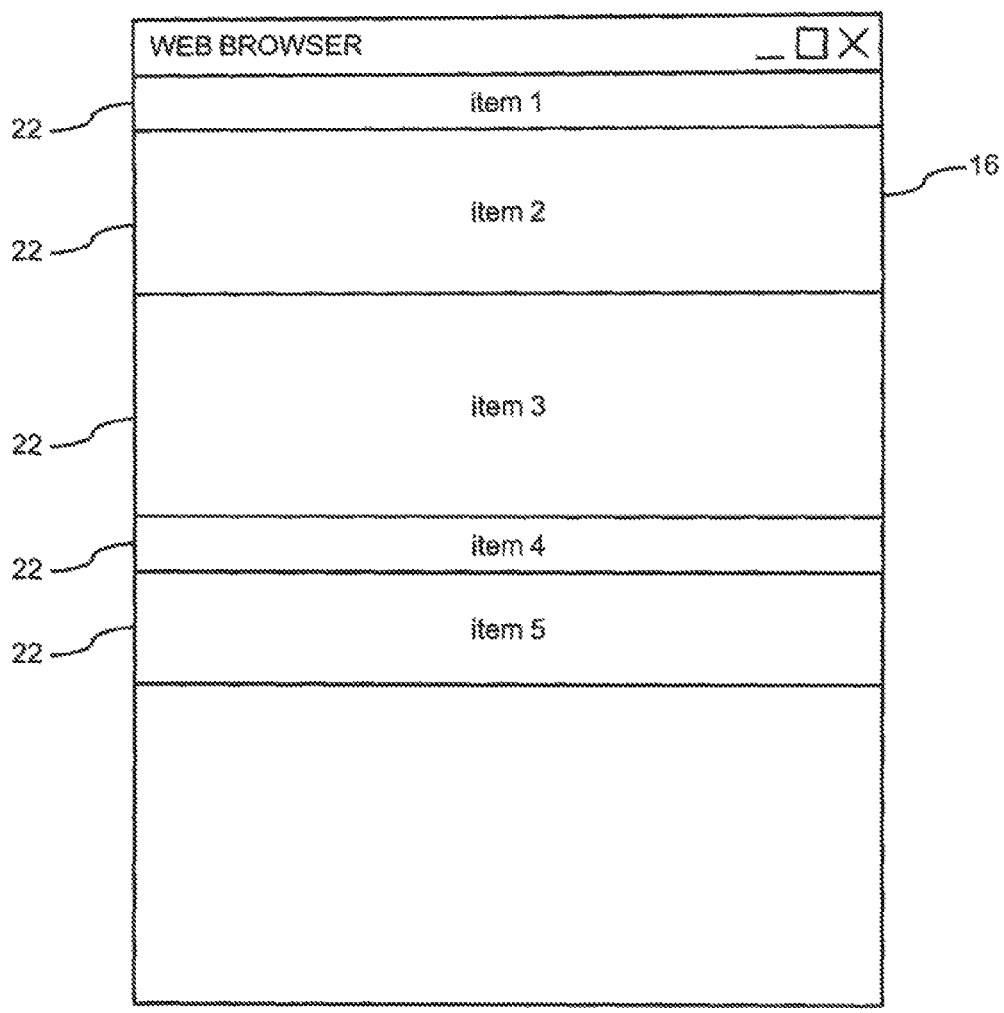
FIGS. 3, 4 and 5 are schematic diagrams of an application window, in which a preferred embodiment of the present invention may be implemented.

FIG. 3 shows this example. Five items 22 of variable size have been rendered in the available display area, as per Step 1 of the process. The approximate sizes of the different items 22 have been calculated, in Step 2 of the process, as per the formulas in the paragraph directly above. The sizes are expressed in terms of an integer multiple of the size of the minimal rendered item. In the example of FIG. 3, the minimal rendered item 22 is the item 1, which occupies a single line of the application window 16. Item 4 is also of the same size, and the other items 22 have their sizes expressed as multiple lines.

Figure 4:
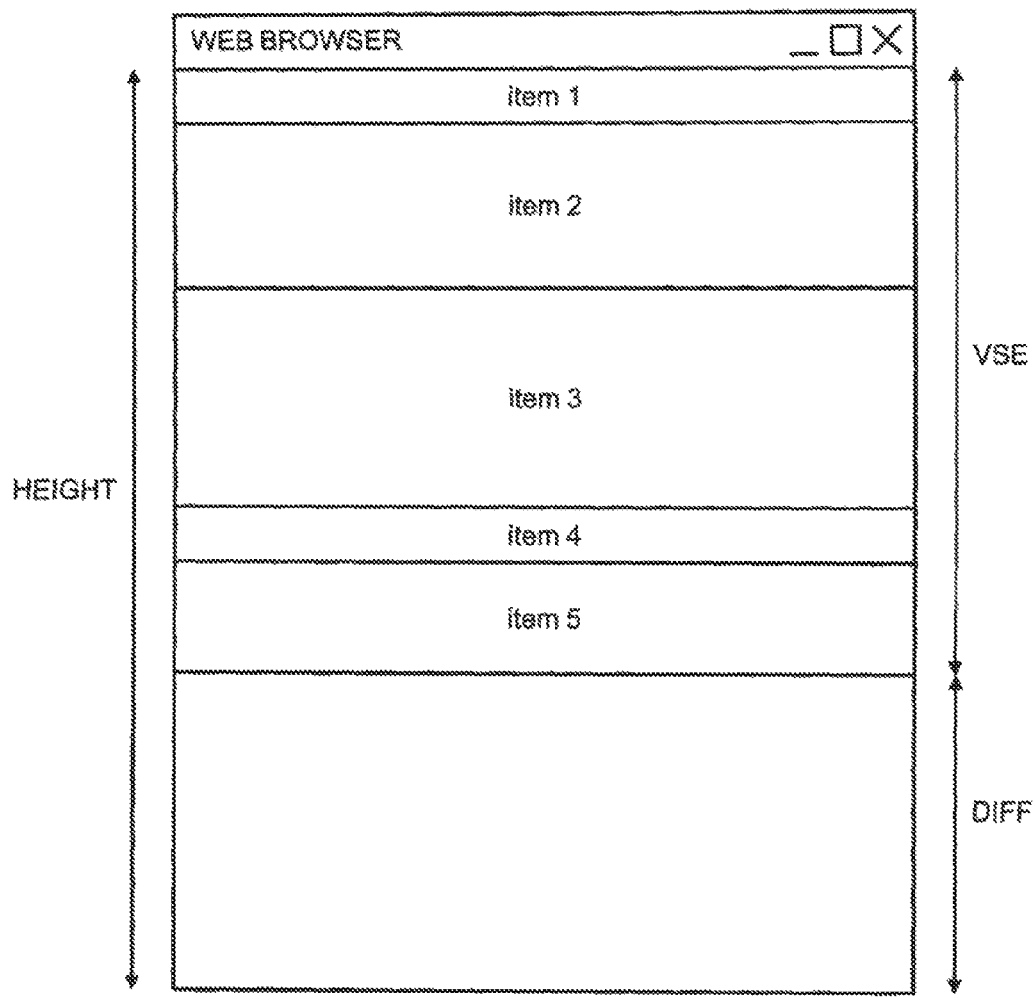

The third step, Step 3, of the method is to calculate the approximate size of a minimal item as equal to the vertical size of the element (VSE) containing all rendered items (in pixels) divided by the sum of the approximate relative item sizes calculated in Step 2. This is illustrated in FIG. 4. The web browser can be queried by the JavaScript program for the VSE, and the sum of approximate relative item sizes, which in the example would be 1+3+4+1+2=11. This then gives an approximation of the number of vertical pixels needed to render one line of the table 20. Only an approximation is calculated here, as each line of the description could require a different number of vertical pixels, as could each different item's fixed content.

The next step in the methodology is Step 4, which comprises calculating the difference between the window height, which can be queried from the web browser, and the VSE and the result can be labelled DIFF, as seen in FIG. 4. The variable DIFF is a difference between the height of the application window 16 and the element VSE which contains all of the rendered items 22. At the fifth step, Step 5, a check is made to see if the VSE containing all rendered items is bigger or smaller than the window height. If the VSE is smaller then it follows that further items 22 need to be added to the table 20 to increase the size to use as much as possible of the application window 16. If the VSE is larger, then items 22 need to be removed.

During Step 5, candidate items for addition/removal need to be identified. If items are to be added and the user is on the first page or has paged forward, then DIFF divided by the minimal item size number of items after the last rendered item are to be considered for inclusion in the current page. If items are to be added and the user is on the last page or has paged backward, then DIFF divided by the minimal item size number of items before the first rendered item are to be considered for inclusion in the current page. If items are to be removed and the user is on the first page or has paged forward, then DIFF divided by the minimal item size number of items counting back from the last rendered item are to be considered for removal from the current page. If items are to be removed and the user is on the last page or has paged backward, then DIFF divided by the minimal item size number of items counting forward from the first rendered item are to be considered for removal from the current page.

The sixth step, Step 6, of the method is to iterate over the items to be considered (from Step 5) and calculate and sum the number of lines needed to display these items using the algorithm in Step 2 above. Once the sum of the number of lines needed to display the items equals the value of DIFF divided by the minimal item size, then the iteration through the considered items can be terminated as enough items have been considered for addition/deletion (as appropriate). At the seventh step, Step 7, there will be included or removed the number of items iterated over in Step 6 depending on whether Step 5 indicated the addition or deletion of items 22.

Figure 5:
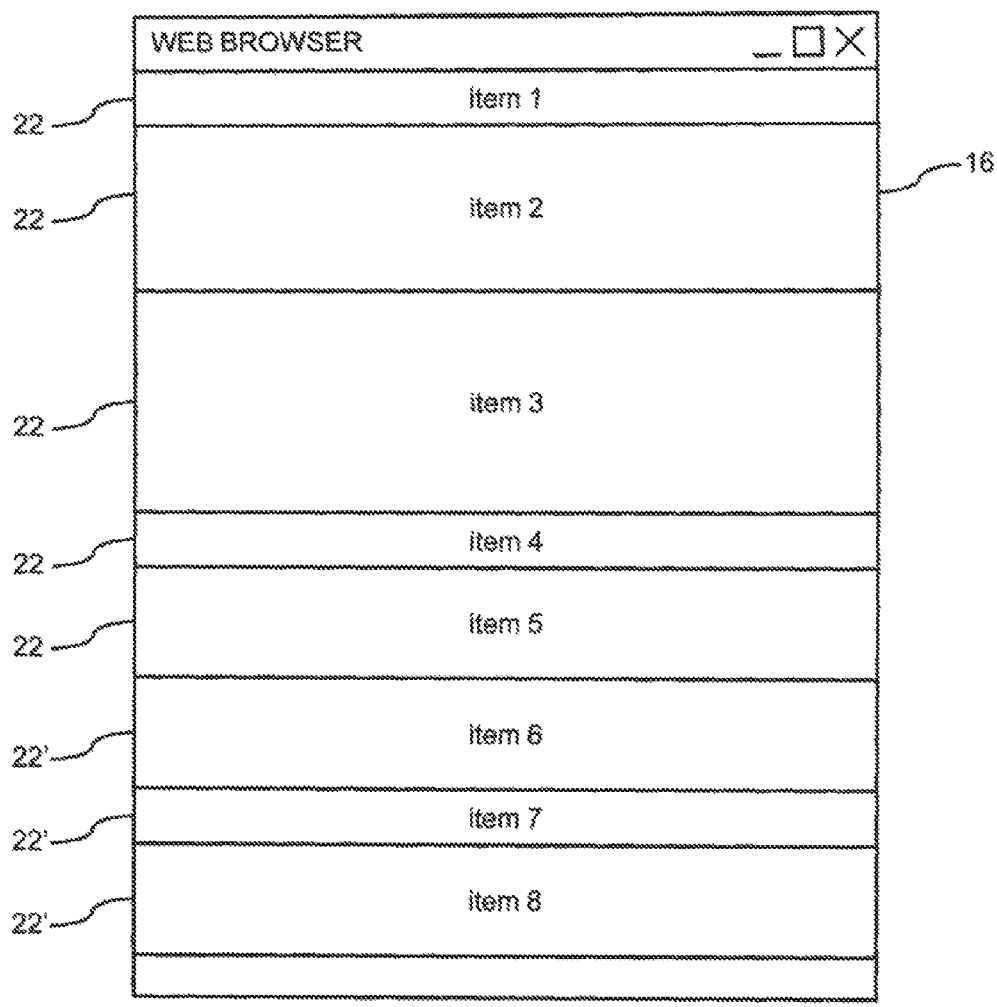

The eighth step, Step 8, then sends back to repeat from Step 2 until there is hit the maximum number of items that can be displayed within the window 16. To determine the stop point in the cycling process, a record is kept each time a number of items is attempted and only once x AND x+1 items has been attempted where x+1 caused VSE to be too large and x was too small, the algorithm has found the correct number of items. If at any point VSE is exactly equal to the window height, then the algorithm has also found the correct number of items. FIG. 5 shows the window 16 with the further items 22' added.

The record of the items 22 is also used to prevent the algorithm from attempting the same number of items 22 again. So in Step 6 of the process detailed above, if the algorithm has already attempted DIFF divided by the minimal item size items 22, then the process will try one more or one less, depending on whether there are too few or too many items displayed. If the record shows that it has already tried one more, then it tries two more, etc. In this way, the process finds the exact number of items 22 that can be fitted into the window 16 without the need for a scroll-bar to be added to the window 16. The user can view all of the items 22 displayed in the window 16 without the need for any further navigation actions.

Figure 6:
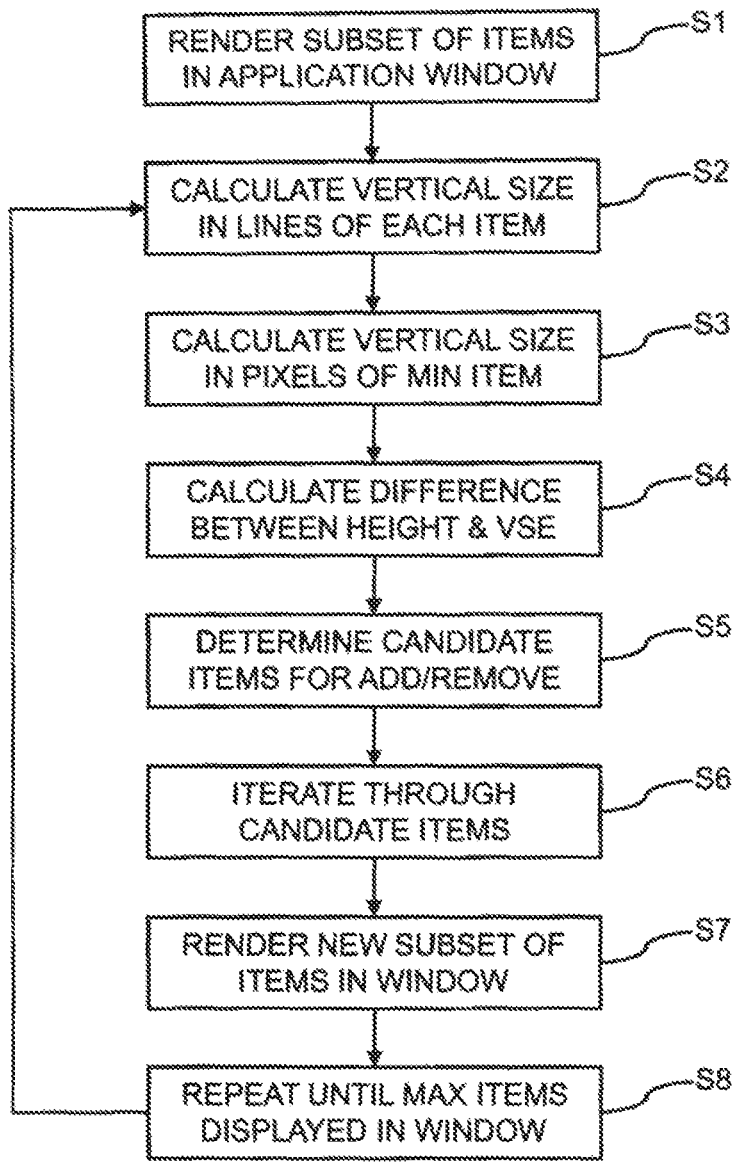
FIG. 6 is a flowchart of a method of displaying a series of items, in which a preferred embodiment of the present invention may be implemented.

A flowchart summarizing the method is shown in FIG. 6. The method of displaying the series of items 22 in an application window 16 on a display device 18 comprises the steps of, firstly, step S1 which is the rendering of a subset of the series of items 22 in the application window 16. The next step is the step S2 of calculating the vertical size of each rendered item 22 as an integer multiple of the vertical size of the minimal rendered item 22. This is preferably measured in lines, as described above. Step S3 comprises calculating the vertical size, in pixels, of the minimal rendered item 22 as the vertical size of the element (VSE) containing all rendered items divided by the sum of the integer values calculated in step S2 of the vertical sizes of the rendered items 22.

This is followed by step S4 of calculating the difference (DIFF), in pixels, of the application window height minus the vertical size of the element (VSE) containing all rendered items 22. This concept is specifically illustrated in FIG. 4. This is then followed by step S5, which comprises determining those candidate items for addition to the subset (if the difference is positive), or determining those candidate items for removal from the subset (if the difference is negative). In this step, the number of candidate items is equal to the difference calculated in step S4 divided by the vertical size of the minimal rendered item calculated in step S3. In this way potential candidate items are determined.

Once the candidate items have been selected, then at step S6 there is performed the step of iterating through the candidate items, calculating the vertical size of each candidate item as an integer multiple of the vertical size of the minimal rendered item, until the sum of the vertical size of the iterated candidate items is equal to the difference calculated in step S4 divided by the vertical size of the minimal rendered item calculated in step S3. Once this threshold is reached, at step S7 there is rendered a new subset of the series of items 22 in the application window 16 by adding or removing the iterated candidate items from step S6 according to the result of step S5. Finally, at step S8, there is repeated steps S2 to S7 until the maximum number of items that can be displayed is displayed.

The invention claimed is:

1. A client device for displaying a series of items in an application window on a display device, the device arranged to:
   a) render a subset of the series of items in the application window,
   b) calculate the vertical size of each rendered item as an integer multiple of the vertical size of the minimal rendered item,
   c) calculate the vertical size, in pixels, of the minimal rendered item as the vertical size of the element containing all rendered items divided by the sum of the integer values calculated in action b) of the vertical sizes of the rendered items,
   d) calculate the difference, in pixels, of the application window height minus the vertical size of the element containing all rendered items,
   e) determine candidate items for addition to the subset if the difference is positive, or determining candidate items for removal from the subset if the difference is negative, the number of candidates items equal to the difference calculated in action d) divided by the vertical size of the minimal rendered item calculated in action c),
   f) iterate through the candidate items, calculating the vertical size of each candidate item as an integer multiple of the vertical size of the minimal rendered item until the sum of the vertical size of the iterated candidate items is equal to the difference calculated in action d) divided by the vertical size of the minimal rendered item calculated in action c),
   g) render a new subset of the series of items in the application window by adding or removing the iterated candidate items from action f) according to the result of action e), and
   h) repeat actions b) to g) until the maximum number of items that can be displayed is displayed.

2. A device according to claim 1, wherein the action b) of calculating the vertical size of each rendered item as an integer multiple of the vertical size of the minimal rendered item comprises calculating the vertical size of each rendered item as a number of display lines.

3. A device according to claim 2, wherein the calculating of the vertical size of a rendered item as a number of display lines comprises calculating the character length of the display item multiplied by a scaling integer derived from the font size, dividing by the width of the application window in pixels, rounding down to a whole number and adding one.

4. A device according to claim 1 and further arranged, when determining candidate items for addition to the subset if the difference is positive in action e), to determine whether items before or after the currently rendered items should be added.

5. A device according to claim 1 and further arranged, when determining candidate items for removal from the subset if the difference is negative in action e), to determine whether items at the start or at the end of the currently rendered items should be removed.

6. A computer program product for displaying a series of items in an application window on a display device, the computer program product comprising:
   a non-transitory computer readable storage medium readable by a processing circuit and storing instructions for execution by the processing circuit for performing a method comprising steps of:
   a) rendering a subset of the series of items in the application window,
   b) calculating the vertical size of each rendered item as an integer multiple of the vertical size of the minimal rendered item,
   c) calculating the vertical size, in pixels, of the minimal rendered item as the vertical size of the element containing all rendered items divided by the sum of the integer values calculated in step b) of the vertical sizes of the rendered items,
   d) calculating the difference, in pixels, of the application window height minus the vertical size of the element containing all rendered items,
   e) determining candidate items for addition to the subset if the difference is positive, or determining candidate items for removal from the subset if the difference is negative, the number of candidates items equal to the difference calculated in step d) divided by the vertical size of the minimal rendered item calculated in step c),
   f) iterating through the candidate items, and calculating the vertical size of each candidate item as an integer multiple of the vertical size of the minimal rendered item until the sum of the vertical size of the iterated candidate items is equal to the difference calculated in step d) divided by the vertical size of the minimal rendered item calculated in step c),
   g) rendering a new subset of the series of items in the application window by adding or removing the iterated candidate items from step f) according to the result of step e), and
   h) repeating steps b) to g) until the maximum number of items that can be displayed is displayed.

7. A computer program stored on a non-transitory computer readable medium and loadable into the internal memory of a digital computer, comprising software code portions, when said computer program is run on the digital computer, for performing a method of displaying a series of items in an application window on a display device, the method comprising steps of:
  a) rendering a subset of the series of items in the application window,
  b) calculating the vertical size of each rendered item as an integer multiple of the vertical size of the minimal rendered item,
  c) calculating the vertical size, in pixels, of the minimal rendered item as the vertical size of the element containing all rendered items divided by the sum of the integer values calculated in step b) of the vertical sizes of the rendered items,
  d) calculating the difference, in pixels, of the application window height minus the vertical size of the element containing all rendered items,
  e) determining candidate items for addition to the subset if the difference is positive, or determining candidate items for removal from the subset if the difference is negative, the number of candidates items equal to the difference calculated in step d) divided by the vertical size of the minimal rendered item calculated in step c),
  f) iterating through the candidate items, and calculating the vertical size of each candidate item as an integer multiple of the vertical size of the minimal rendered item until the sum of the vertical size of the iterated candidate items is equal to the difference calculated in step d) divided by the vertical size of the minimal rendered item calculated in step c),
  g) rendering a new subset of the series of items in the application window by adding or removing the iterated candidate items from step f) according to the result of step e), and
  h) repeating steps b) to g) until the maximum number of items that can be displayed is displayed.

* * * * *